United States Patent
Oberle et al.

(10) Patent No.: US 7,467,565 B2
(45) Date of Patent: Dec. 23, 2008

(54) GEARBOX DRIVE UNIT WITH AN INCLINED STOP SURFACE

(75) Inventors: Hans-Juergen Oberle, Rastatt (DE); Andreas Lienig, Buehl (DE); Mario Huesges, Buehlertal (DE); Fabian Louvel, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/529,275

(22) PCT Filed: Apr. 11, 2003

(86) PCT No.: PCT/DE03/01233

§ 371 (c)(1),
(2), (4) Date: Mar. 25, 2005

(87) PCT Pub. No.: WO2004/031613

PCT Pub. Date: Apr. 15, 2004

(65) Prior Publication Data

US 2005/0241420 A1    Nov. 3, 2005

(30) Foreign Application Priority Data

Sep. 27, 2002    (DE) ................. 102 45 269

(51) Int. Cl.
*F16H 55/18*    (2006.01)
*F16H 1/16*    (2006.01)
(52) U.S. Cl. ........................... 74/409; 74/425

(58) Field of Classification Search ............. 74/425, 74/606 R, 422, 498, 424, 424.6, 424.7, 412, 74/412 R, 412 TA, 409, 411, 416, 427; 15/250.3, 15/250.16
See application file for complete search history.

(56) References Cited

U.S. PATENT DOCUMENTS

| 3,549,218 | A |   | 12/1970 | Cagnon et al. |
| 3,848,477 | A | * | 11/1974 | Giandinoto et al. ......... 74/425 |
| 4,212,379 | A | * | 7/1980 | Zoino .................. 192/52.3 |
| 6,352,006 | B1 | * | 3/2002 | Kurashita ................ 74/409 |
| 6,805,024 | B1 | * | 10/2004 | Shufflebarger et al. .... 74/606 R |
| 7,034,421 | B1 | * | 4/2006 | Walther .................. 310/90 |

(Continued)

FOREIGN PATENT DOCUMENTS

DE    2312395    9/1973

(Continued)

*Primary Examiner*—Richard W Ridley
*Assistant Examiner*—James Pilkington
(74) *Attorney, Agent, or Firm*—Michael Best & Friedrich LLP

(57) ABSTRACT

The invention relates to a gear drive unit (10), in particular to adjust moveable parts in a motor vehicle, with a gear housing (15) and a shaft (18) positioned therein along a longitudinal axis (30), which shaft is supported on the housing (15) via an axial stopping face (35) on a counter stopping face (36), wherein at least one of the stopping faces (35, 36) is inclined perpendicular to the longitudinal axis (30) against a plane (42) by an angle of inclination (40) in order to generate an axial force, and a component (44), which cooperates with at least one of the stopping faces (35, 36), is arranged in a displaceable manner perpendicular to the longitudinal axis (30). In doing so, the coefficient of friction between the at least one stopping face (35, 36) and the component (44) is greater than the tangent of the angle of inclination (40).

18 Claims, 6 Drawing Sheets

U.S. PATENT DOCUMENTS 7,116,025 B2 * 10/2006 Myerly et al. .................. 310/90

FOREIGN PATENT DOCUMENTS

| | | | |
|---|---|---|---|
| DE | 0023024 | * | 1/1981 |
| DE | 0563410 | * | 10/1993 |
| DE | 19520886 | | 10/1996 |
| DE | 19854535 | | 6/2000 |
| EP | 0023024 | | 1/1981 |
| EP | 0563410 | | 10/1993 |

* cited by examiner

GEARBOX DRIVE UNIT WITH AN INCLINED STOP SURFACE

BACKGROUND OF THE INVENTION

The invention starts with a gear drive unite, in particular for adjusting moveable parts in a motor vehicle.

A drive device for a windshield wiper system of a motor vehicle, which features a housing and an armature shaft positioned rotatably therein that has a worm, became known with DE 198 545 35 A1. Using an axial force generating device, a wedge slider is hereby displaced radially to the armature shaft in order to equalize the axial play of the armature shaft. The displacement force of the wedge slider is applied via a prestressed spring element, which presses the wedge slider radially against a limit stop of the armature shaft, thereby displacing the shaft axially until the axial play is equalized. On the other hand, with a great load to the armature shaft via a driven gear, an axial force occurs, which presses the armature shaft against the wedge slider and in doing so the wedge slider is pressed back radially away from the armature shaft against the spring element. This type of great permanent load on the spring element leads to a situation where its service life or its elastic properties are diminished and therefore the axial play of the armature shaft is no longer equalized so that it moves back and forth axially under load, which can produce unpleasant clicking noises.

SUMMARY OF THE INVENTION

The gear drive unit in accordance with the invention has the advantage that an axial force generating device is arranged in such a way that its coefficient of friction prevents a component that equalizes the axial play from receding radially. To do this, the geometry, the surfaces and the materials for the axial force generating device are selected in such a way that the coefficient of friction between a stopping face inclined by an angle of inclination against the perpendicular of the shaft and the surface of the component is greater than the tangent of the angle of inclination. In doing so, the component is displaced radially to the shaft as soon as the shaft has longitudinal play. Pushing back the component is prevented, however, by the frictional condition. As a result, an elastic element, which is used to displace the component, does not have to absorb any high restoring forces, which are initiated via the shaft on the component. Therefore, the elasticity of the elastic element is retained over its entire service life, thereby reliably eliminating the longitudinal play of the shaft over the entire service life.

In addition, the shaft longitudinal play is hereby eliminated without this longitudinal play having to be measured beforehand during the assembly of the device in order to equalize it, e.g., by means of selectively mounted equalizing plates. As a result, the number of stations on the assembly line is reduced and the assembly device is simplified. The axial force generating device can be manufactured using modular principles so that it is compatible with many different drive units.

Advantageous developments of the device are possible. Thus, the coefficient of friction between the surface of the component and the inclined stopping face is increased in an especially favorable way by forming a profile on one of the two friction surfaces. If, for example, a saw-tooth-like profile is formed on at least one of the surfaces, the component can be moved radially towards the shaft with less force, but can only be moved back radially again with a considerably higher expenditure of force. As a result, this type of structured surface leads to the elastic element for displacing the component not being excessively stressed. Therefore, the elastic element can be displaced back radially over the entire service life of the device in order to eliminate the axial play that is occurring. Because of forming such a profile on the friction surface between the component and the stopping face, the angle of inclination of the stopping face can be selected to be greater, thereby making greater travel available to equalize the shaft longitudinal play. In a preferred embodiment, one of the two stopping faces or the component can feature a stair-step-like surface, in which the "stepping surfaces" are aligned to be approximately perpendicular to the longitudinal axis of the shaft. As a result, a restoring force of the component radially away from the shaft is practically completely prevented with the effect of a axial force from the shaft. This produces a situation where no shaft longitudinal play is permitted even in the case of extreme loads on the shaft.

If the inclined surface forms a cone so that a truncated cone surface area is produced, the shaft is supported on a radially symmetrical surface, whereby the shaft remains very precisely centered radially symmetrically even under load. The purpose of the cone-shaped surface is so that at least one component can be displaced simultaneously from all sides uniformly towards the shaft axis.

It is particularly favorable if one of the stopping faces is embodied as one part together with the component. As a result, no additional stopping elements are required, thereby reducing assembly expenses.

If the component features a U-shaped design, then the component can be used in an especially favorable way also for a plunging-through shaft. In this case, the component is not arranged on the front side of a shaft, but surrounds the shaft and is supported, e.g., on a collar that is manufactured on it. This type of U-shaped component is also advantageous for the application of a shaft, which is supported with a stopping sleeve, because the U-shaped component surrounds the stopping sleeve in order to reduce the structural length of the drive.

In a preferred embodiment, the component is embodied to be annular and radially elastically tensile. As a result, this component slides on the basis of its pre-stress into the gap between the two stopping faces so that no additional elastic element, which acts on the component with a displacement force, is required. If such a component that is embodied as an elastic ring element is coupled with a stair-step-shaped stopping face, which is embodied as a cone, then the spring ring contracts in order to again equalize the increased axial play from the signs of wear. In the process, it is not necessary for the elastic ring element to be supported on the housing.

In order to reduce the structural length of the gear drive unit, the component can feature two separate wedge surfaces, which are connected to one another via a surface that is arranged perpendicular to the axis of the shaft. In doing so, the wedge-shaped component can be displaced back radially against the shaft over the course of time, whereby the structural height of the overall drive device is reduced by reducing the overall height of the component. In the process, the axial forces of the shaft are favorably absorbed very uniformly over a large diameter of the stopping face.

The axial force generating device in accordance with the invention can be arranged on both the front side or on a collar of the shaft, thereby guaranteeing a high variance for different designs of the gear drive unit.

If the shaft features a worm toothing, which meshes with a worm wheel for example, very high axial shaft forces occur, if for example a moveable part is moved against a limit stop. In just the same way, in the case of a spindle drive with thread toothing on the shaft, strong axial forces occur when accelerating or decelerating the moveable parts. The dynamic axial play that occurs in the process is equalized reliably and on a long-term basis via the device in accordance with the invention.

It is advantageous if the component is constantly guided back by a displacement force, which is applied by a pre-stressed elastic element. The stored energy of the spring element leads to a situation where such a self-adjusting axial play equalization presses the component with adequate force against the shaft over the entire service life of the gear drive.

It is especially favorable for assembly if the pre-mounted elastic element is pre-stressed directly with the fastening of the covering of the gear housing. Because of the radial assembly of the elastic element, no other auxiliary tools are required for this.

Even more favorable from a procedural point of view is if the elastic element is designed either as an integral part of the covering of the gear housing or the component since the elastic element is thereby directly positioned during assembly of the component or the gear housing covering and assembly is simplified by the reduction in the [number of] components.

If the component is embodied as one piece with the elastic element, it can be formed of a leaf spring for example. So that the wedge-shaped embodied leaf spring can absorb greater axial forces on their fore parts, it is embodied to be wavy in the area of the acting axial force for stability reasons. The free ends of the leaf spring simultaneously support the component in the process against the gear housing in order to guide the component back perpendicularly towards the shaft longitudinal axis. In this case, the component can be manufactured together with the elastic element very cost-effectively as a bent punch part.

The angle of inclination of the stopping face can be enlarged by a saw-tooth profile, thereby making greater travel available to equalize the shaft longitudinal play.

The drawings depict exemplary embodiments of a device in accordance with the invention and they are explained in greater detail in the following description.

BRIEF DESCRIPTION OF THE DRAWINGS

The drawings show:

FIG. 5b A top view of the component from FIG. 5a.

FIG. 6b A top view of the component in FIG. 6a.

FIG. 9b A top view of the component in accordance with FIG. 9a.

DETAILED DESCRIPTION

Figure 1:
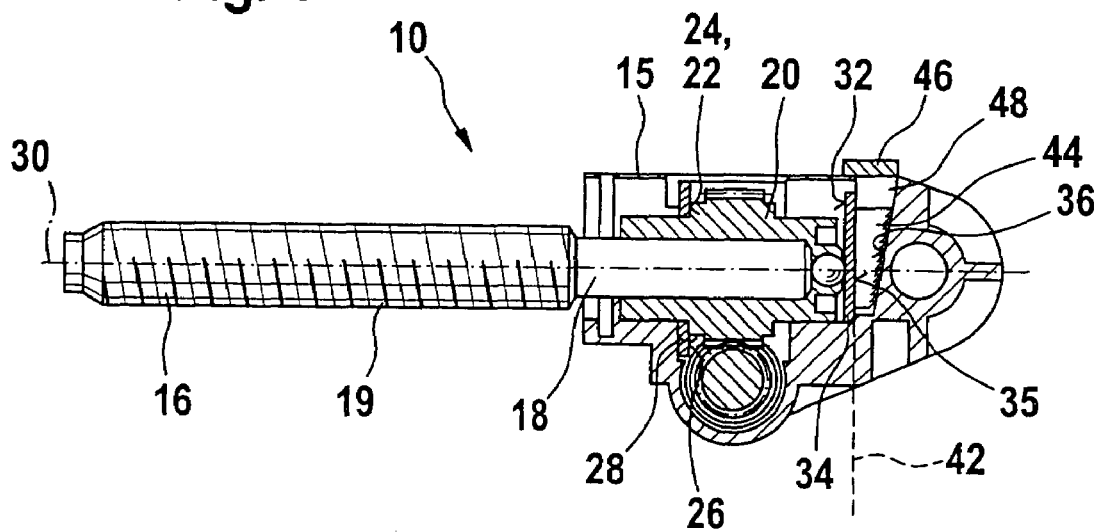
FIG. 1 A section of an exemplary embodiment of a gear drive unit.

The exemplary embodiment depicted in FIG. 1 shows a section of a gear drive unit 10 in accordance with the invention in which an electric motor 12 (not shown in greater detail) drives via a worm gear 14 a shaft 18 embodied as a spindle 16, which projects out of the gear housing 15 of the worm gear 14. A worm wheel 20 featuring a collar 22 is formed on the shaft 18. This collar 22 forms a first stopping face 24, which is supported on a counter stopping face 26 of a stopping plate 28, which is adjacent to the gear housing 15. The shaft 18 that is positioned along a longitudinal axis 30 is supported with a fore part 32 on another stopping element 34 on the front side, which features a stopping face 35 on the side facing away from the fore part 32. Embodied on the gear housing 15 is another stopping face 36, which is inclined by an angle of inclination 40 against a plane 42 perpendicular to the longitudinal axis 30. Arranged between the diagonal stopping face 36 and the stopping face 35 of the stopping plate 34 on the front side is a component 44, which can be displaced perpendicular to the longitudinal axis 30 to eliminate the shaft longitudinal play. The component 44 is embodied to be wedge-shaped in the exemplary embodiment so that the wedge angle corresponds to the angle of inclination 40 of the inclined stopping face 36. An elastic element 48 is arranged between the component 44 and a housing part 46 and the elastic element presses the component 44 radially into the gap 64 against the longitudinal axis 30.

Figure 2:
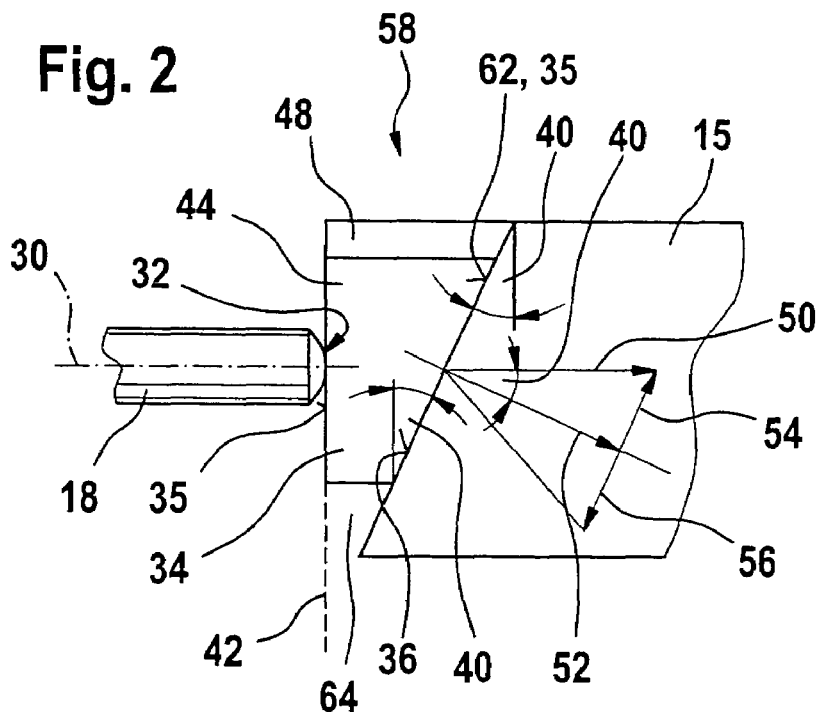
FIG. 2 A schematic representation of the forces occurring in accordance with FIG. 1.

The operating principle of this axial force generating device is depicted schematically in FIG. 2. The stopping element 34 in this case is embodied as one piece with the component 44 so that the stopping face 35 is formed directly by the fore part 32 of the shaft 18. When the shaft 18 is under load, an axial force 50 acts along the longitudinal axis 30 on the component 44, which passes on this axial force 50 to the stopping face 36. Resulting on the inclined stopping face 36 from the axial force 50 are a normal force 52 perpendicular to the stopping face 36 and a downhill slope force 54 parallel to the stopping face 36, which pushes back the wedge-shaped component 44 against the elastic element 48 from the gap 64 between the shaft 18 and the stopping face 36. A frictional force 56, which is generated when displacing the component 44 against the stopping face 36, acts against the downhill slope force 54. In order to prevent the axial force 50 from pushing the component 44 back against a displacement force 58 applied by the elastic element 48 in the case of a strong axial load of the shaft, according to the invention, the frictional force 56 is greater than the maximum occurring downhill slope force 54 in the case of maximum axial load of the shaft 18. This results mathematically in the tangent of the angle of inclination 40 being less than the coefficient of friction, which corresponds to the frictional force 56. The coefficient of friction in this case is essentially determined by the selection of material and the surface quality of the surfaces that can be displaced against each other.

Figure 3:
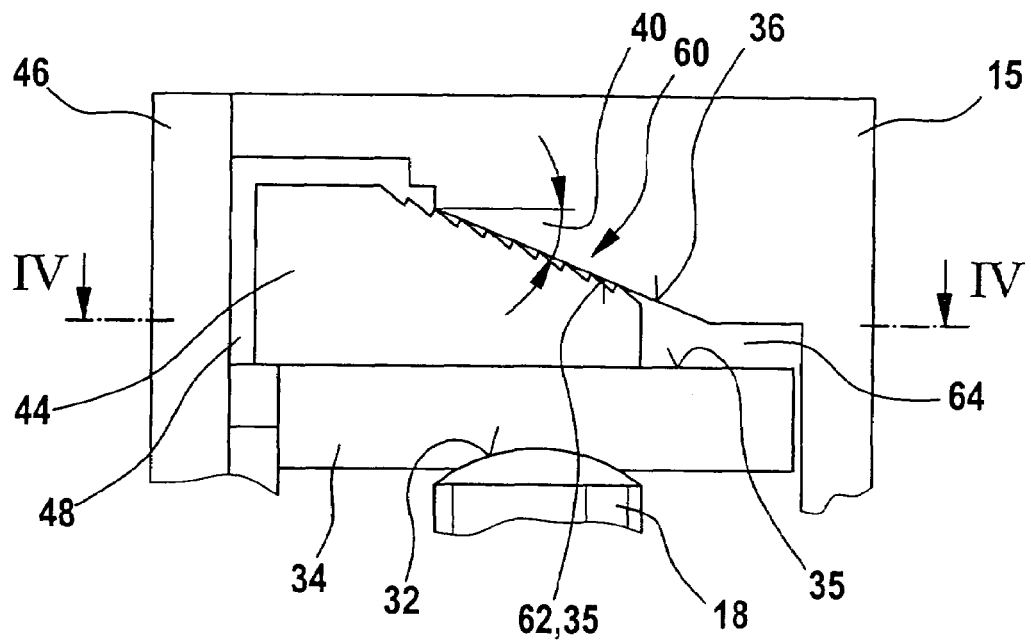
FIG. 3 An enlarged section of another exemplary embodiment in accordance with FIG. 1.

FIG. 3 depicts a component 44, in which the coefficient of friction is increased via a saw-tooth profile 60 on a friction surface 62 between the component 44 and the diagonal stopping face 36. In this case, the saw-tooth-like profile 60 is formed on the component, but can just as well be arranged on the diagonal stopping face 36 of the housing 15 or on the stopping face 35. The saw-tooth profile 60 is formed in such a way that the wedge-shaped component 44 can be displaced perpendicularly toward the shaft 18 with less displacement force 58 of the elastic element 48 than [when] this is pressed back via the downhill slope force 54. If the axial play increases again, e.g., due to wear of the stopping plate 34, the component 44 is pushed further into the gap 64 between the stopping face 35 of the stopping plate 34 and the diagonal stopping face 36 of the housing 15 due to the elastic force 58 with which the elastic element 48 is supported against the housing part 46.

Figure 4:
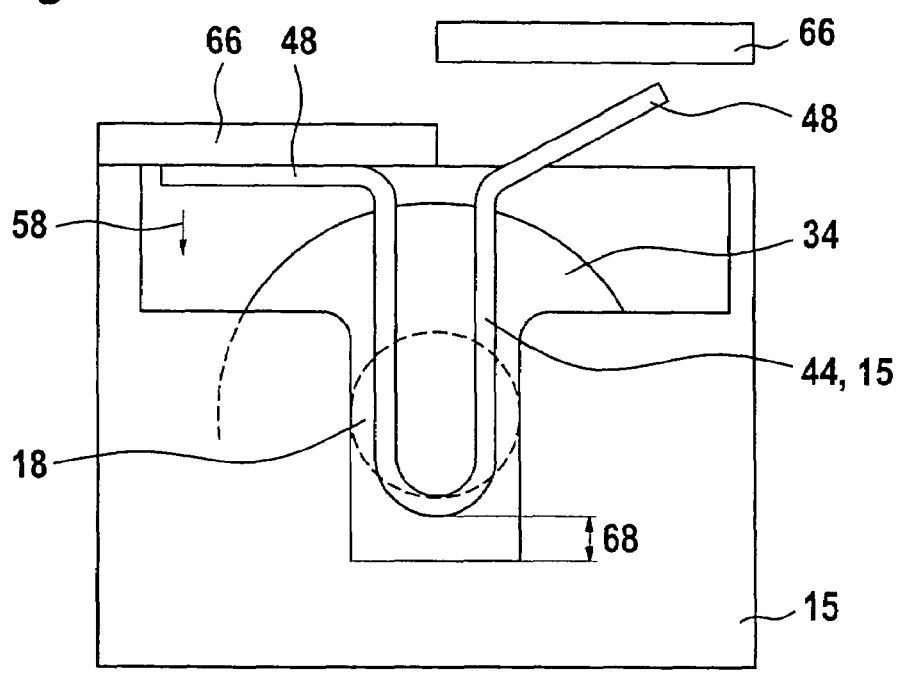
FIG. 4 Another exemplary embodiment during assembly of the component.

FIG. 4 shows another exemplary embodiment in a representation in accordance with Section IV-IV in FIG. 3. The component 44 is embodied to be U-shaped, whereby in this case both legs are arranged against the fore part 32 of the shaft 18. The elastic element 48 is embodied to be one piece as an integral part of the component 44, whereby the one-piece component 44 is punched out of a steel sheet for example. During assembly, the component 44 is inserted into the gap 64 between the stopping plate 34 and the inclined stopping face 36 and the elastic elements 48 are pre-stressed with the fastening of a covering 66 of the housing 15. The right half of the illustration shows the device 10 before assembly of the covering 66 and the left half of the illustration shows it after the covering 66 has been assembled. In doing so, the component 44 is pressed radially towards the shaft 18 with the force 58 of the elastic element 48. For further equalization of the longitudinal play, the component 44 has a free displacement path 68 at its disposal via which the component 44 can be subsequently displaced.

Figure 5A:
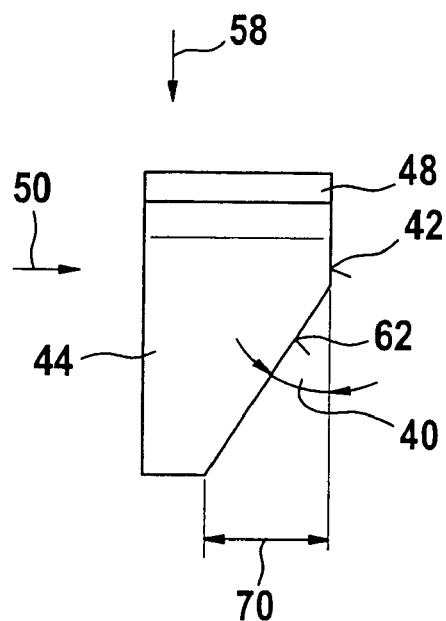
FIG. 5a A side view of the component from FIG. 4.
Figure 5B:
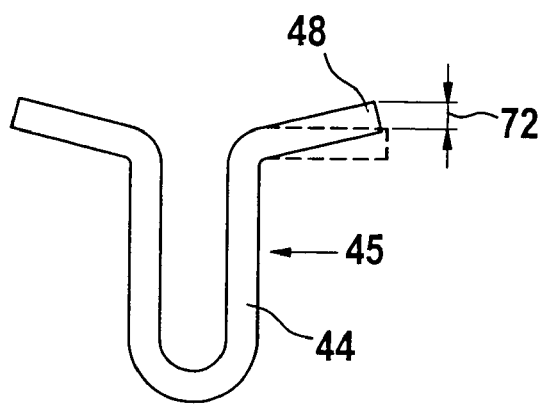

FIGS. 5a and 5b depict the component 44 from FIG. 4 again in a side view and a top view. The friction surface 62 of the component 44 is arranged against the plane 42 by the same angle of inclination 40 as the corresponding stopping face 36 of the housing 15. The angle of inclination 40 and the overall length of the component 44 define a maximum travel 70 by which the shaft longitudinal play can be equalized at a maximum. FIG. 5b depicts a maximum spring range 72 by which the elastic element 48 can be pre-stressed via the housing part 46 during assembly. This range 72 results in the force 58 with which the elastic element 48 presses the component 44 into the gap 64.

Figure 6A:
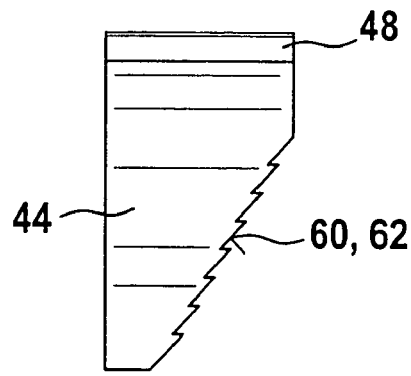
FIG. 6a A side view of another component.
Figure 6B:
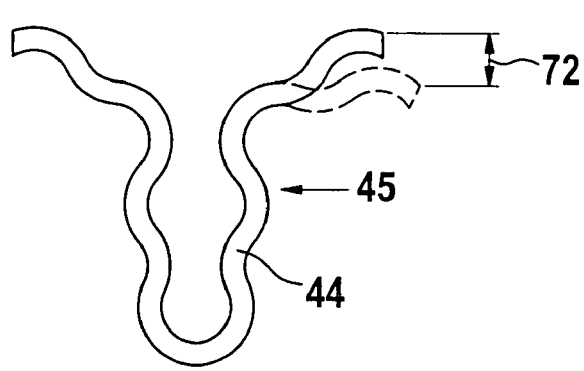

FIGS. 6a and 6b depict a variation of the component 44 from FIGS. 5a and 5b, whereby a saw-tooth profile 60 is formed on the friction surface 62 of the wedge-shaped component 44 in this case. The U-shaped component 44 is embodied in this case to be wavy, as shown in FIG. 6b, in order to be able to absorb greater axial forces 50. The maximum spring range 72 of the elastic element 48 is greater in this example whereby the component 44 is pressed against the longitudinal axis 30 with greater force 58.

Figure 7:
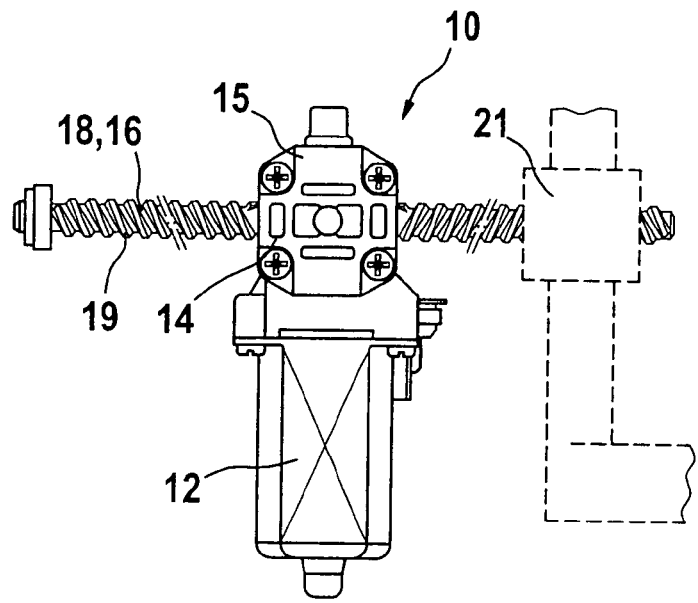
FIG. 7 Another exemplary embodiment of an immersion spindle drive.

FIG. 7 depicts another exemplary embodiment of a gear drive unit 10 namely a plunging-through spindle motor, whose shaft 18 cannot be supported on its fore parts 32 on the end of the shaft 18. In this case, an electric motor 12 drives a worm wheel 20 via a worm of the armature shaft and the worm wheel is positioned rotationally secured on the shaft 18. Since the shaft 18 that is formed as a spindle 16 projects out of the gear housing 15 on both sides of the worm wheel 20, the shaft 18 is positioned axially via two annular stopping faces 24.

Figure 8:
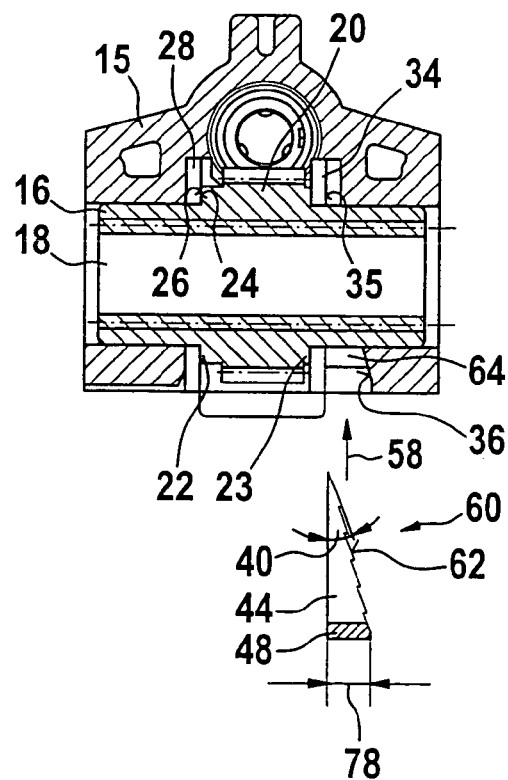
FIG. 8 The assembly of the component in accordance with FIG. 7 is shown in cross-section.

This is depicted in a section through the gear housing 15 in FIG. 8. The worm wheel 20 of the shaft 18 has a collar 22 on the one side, which forms a stopping face 24, which is adjacent with the stopping face 26 of a stopping plate 28, which is supported in turn on the gear housing 15. On the axially opposite side of the worm wheel 20 it also has a collar 23, which the shaft 18 also uses to support itself on a stopping plate 34 on this side. A stopping face 36 that is inclined against the plane 42 by the angle of inclination 40 and through which the shaft 18 penetrates is formed in this exemplary embodiment for equalizing the axial play. In this case, a wedge-shaped component 44 is inserted perpendicular to the shaft 18 between the stopping face 35 of the stopping plate 34 and the inclined stopping face 36 of the gear housing 15 in order to equalize the axial play between the shaft 18 and the housing 15 that is caused by manufacturing and operation. The component 44 has a wedge angle 40, which corresponds to the angle of inclination 40 of the inclined stopping face 36. Sharp edges 61 are formed on the friction surface 62 towards the stopping face 36 and these sharp edges correspond to a saw-tooth profile 60. The component 44 is pressed into the gap 64 between the stopping plate 34 and the stopping face 36 with a force 58, which is generated by the pre-stressed elastic element 48. In this case, the element 44 cannot be embodied to be flat, as is possible with a support of the shaft 18 via its fore parts 32, but the component 44 is embodied to be U-shaped or arched in order to surround the shaft 18.

Figure 9A:
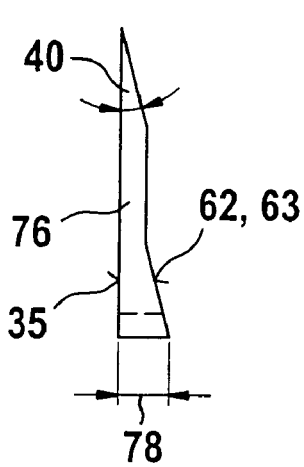
FIG. 9a A side view of another component in accordance with FIG. 8.
Figure 9B:
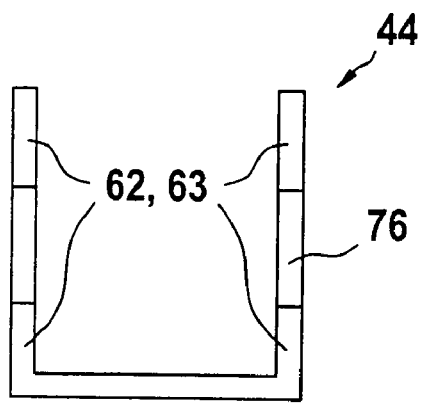

One variation of the U-shaped component 44 is depicted in FIG. 9a and FIG. 9b in a side view and a top view. The friction surface 62, which is embodied in this case a smooth surface 63, is subdivided into two offset regions in the side view, which are connected via a surface 76, which runs parallel to plane 42. With this embodiment the corresponding stopping face 36 has a correspondingly stepped wedge profile. In this connection the structural height 78 of the component 44 can be reduced without the angle of inclination 40 being reduced as a result. FIG. 9b shows the component 44 in the top view with the partial friction surfaces 62 and the intermediate surfaces 76, which run parallel to the plane 42. The housing 15 (or alternatively also the approximately quadratic stopping plate 34) must have a correspondingly inclined stopping face 36 in the area of the U-shaped, formed friction surface 62. It is essential that one of the two stopping faces 35 or 36 is inclined in accordance with the wedge angle 40 of the component. In one variation, the component is embodied as a two-sided wedge and the two stopping faces 35, 36 are each inclined by the one angle portion.

Figure 10A:
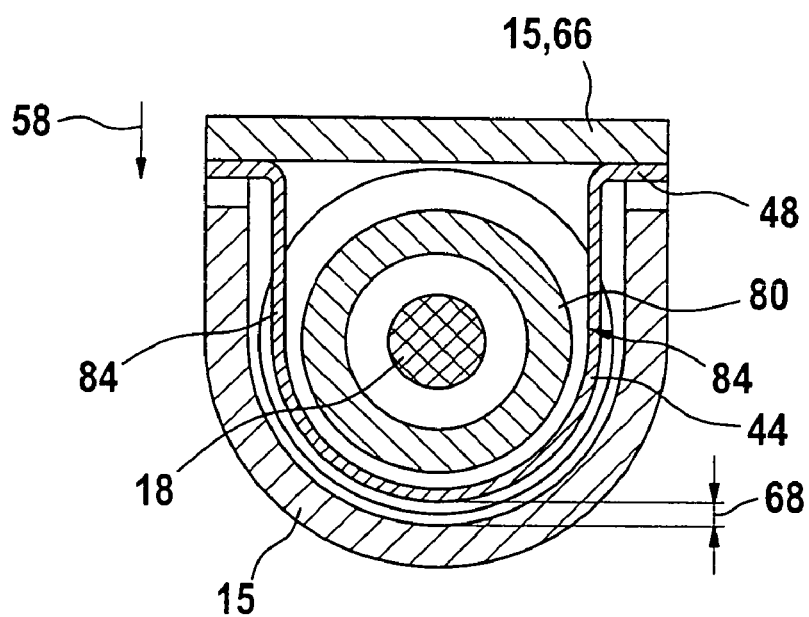
FIG. 10a A section of a gear drive unit with a stopping sleeve.
Figure 10B:
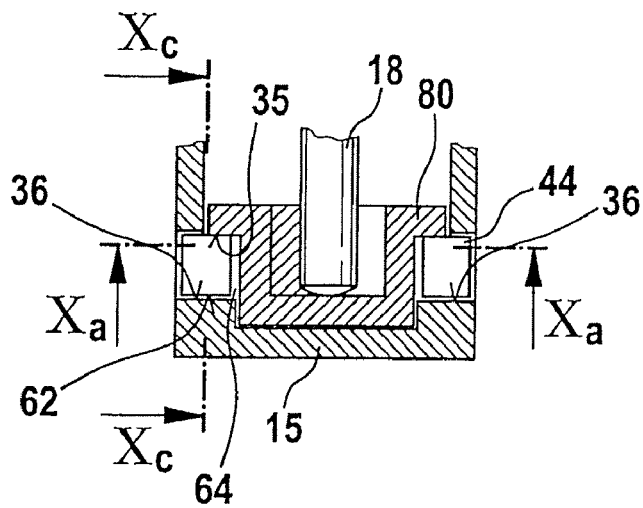
FIG. 10b A section of a gear drive unit with a stopping sleeve.
Figure 10C:
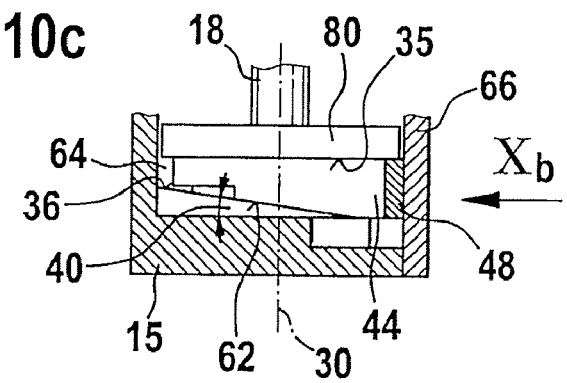
FIG. 10c A section of a gear drive unit with a stopping sleeve.

FIGS. 10a through 10c depict another exemplary embodiment in which a shaft 18 is positioned axially on its fore part 32 in a stopping sleeve 80. An annular stopping face 35 is again formed on the stopping sleeve 80, and the stopping face is adjacent to the arched embodied component 44 that surrounds the stopping sleeve 80. The component 44 supports itself on the other hand via the friction surface 62 on the stopping face 36 that is inclined by the angle of inclination 40.

The component 44 is again embodied to be one piece with the elastic element 48, which supports itself on a covering 66 of the gear housing 15. The one-piece component 44 is manufactured as a leaf spring 45 similar to in FIGS. 5a and 5b, whereby this leaf spring is embodied to be wedge-shaped particularly in the areas 84 in the insertion direction. The component 44 has a displacement path 68 at its disposal for equalizing the longitudinal play occurring during the operating time via which the component can be subsequently pushed into the gap 64 via the elastic force 58 of the elastic component 48.

Figure 11:
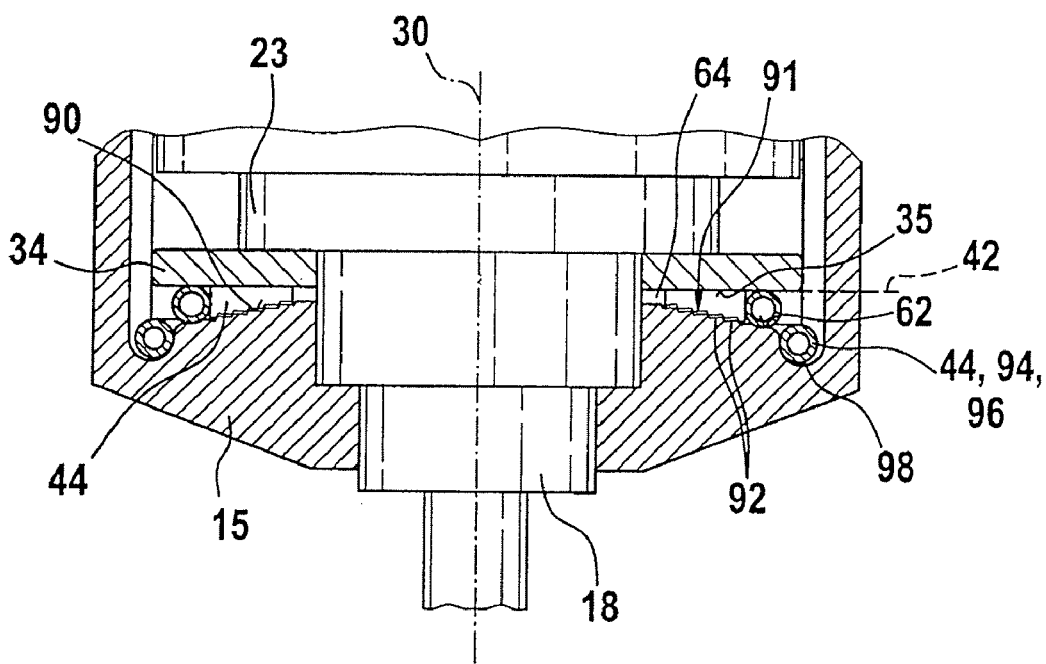
FIG. 11 A section of another exemplary embodiment with a stair-step-shaped cone as a stopping face.

FIG. 11 shows another exemplary embodiment, in which the inclined stopping face 36 is embodied as a cone 90. The shaft 18 features a collar 23, which is adjacent to an annular stopping plate 34. In this case, the inclined stopping face 36 is not embodied as a flat plane, but radially symmetrical as a truncated cone surface area 90, which forms the angle of inclination 40 with the plane 42. The shaft 18 penetrates the stopping face 36 in the center of this cone 90 so that this exemplary embodiment is also suitable for a plunging-through spindle 16. The cone-shaped stopping face 36 features a stair-step-like profile 91 in this case so that the individual ring surfaces 92 run approximately parallel to the plane 42. An elastic ring element 94, via which the shaft 18 is supported on the housing 15, is arranged as a component 44 between the stopping face 35 of the stopping plate 34 and the conical stopping face 36. The elastic ring element 94 is comprised, e.g., of a put-together spiral spring 96, which is mounted under pre-stress in a resting position 98 in the gear housing 15. The annular spring 96 tensions as soon as it is shifted out of its resting position 98 into the gap 64 between the two stopping faces 36 and 35 and contracts so much until the axial play is equalized. If the axial play increases, e.g., due to wear, the spiral spring 96 can contract further radially in the gap 64. When the shaft 18 exerts an axial force 50 on the component 44, the formed-on, annular steps 92 prevent the component from being forced back out of the gap 64 radially away from the longitudinal axis 30 since no downhill slope force 54 results because of the parallel alignment of the ring surfaces 92 to the stopping plate 34. In this connection, the frictional condition that the coefficient of friction is supposed to be greater than the tangent of the angle of inclination 40 of the conical surface 36 is guaranteed by the step-shaped profile. In an alternative embodiment, the stopping face 36 that is embodied as a cone 90 features a smooth surface 63, and the component 44 is manufactured at least on its surface of a material that yields a high coefficient of friction in connection the surface of the cone 90. In the case of the embodiment according to FIG. 11, no separate elastic element 48, which is supported on a housing part 46, is required either, but because of the elastic design of the component 44 as an annular spring 96, the displacement force 58 is applied via the radial pre-stress of the elastic ring element 94.

In another variation of this exemplary embodiment, instead of the elastic ring element 94, several wedge-shaped components 44 are situated in the gap 64 between the step-shaped cone 90 and the stopping face 35 of the stopping plate 34. In this case, it is preferred that the components 44 be embodied as circular ring segments, whose friction surface 62 also features step-shaped ring surface segments, which run approximately parallel to the ring surfaces 92 of the cone or to the plane 42. These components are pressed into the gap 64 by means of elastic elements 48, which are supported for example either on the gear housing 15. Alternatively, one annular spring 96 is arranged around the components 44 on their radial outer surfaces, and the annular spring exerts a radial displacement force 58 on the wedge-shaped, stepped components 44 during contraction.

The axial force generating device in accordance with the invention is used preferably with plunge-through spindle drives, but it can also be used for supporting armature shafts with any drive elements or other drive components. In addition, the invention also includes individual features of the exemplary embodiments or any given combination of the features of different exemplary embodiments.

The invention claimed is:

1. Gear drive unit, to adjust moveable parts in a motor vehicle, comprising a gear housing and a shaft positioned therein along a longitudinal axis, the shaft being supported in the housing via an axial stopping face and a counter stopping face, wherein at least one of the stopping faces is inclined in respect to a plane surface that is perpendicular to the longitudinal axis by an angle of inclination in order to generate an axial force, wherein a component, which cooperates with at least one of the stopping faces, is displaceable perpendicular to the longitudinal axis by means of an elastic element that is a bent punched part of the component, such that the component and the element are monolithic, and the component is wedge-shaped and causes the elastic element to displace in a radial direction with respect to the shaft thereby maintaining an axial force to eliminate shaft longitudinal play.

2. Gear drive unit according to claim 1, characterized in that at least one of the stopping faces or the component features a saw-tooth profile.

3. Gear drive unit according to claim 1, characterized in that at least one of the stopping faces or the component features a stair-step profile.

4. Gear drive unit according to claim 1, characterized in that the component is one piece with the at least one stopping face, as a stopping element.

5. Gear drive unit according to claim 1, characterized in that the component is U-shaped, and surrounds the shaft or a stopping sleeve of the shaft.

6. Gear drive unit according to claim 1, characterized in that the component is a 2-step wedge.

7. Gear drive unit according to claim 1, characterized in that the shaft features a fore part and/or at least one collar, with which the shaft is supported on the gearing housing via the component.

8. Gear drive unit according to claim 1, characterized in that the shaft features a worm toothing or thread toothing, and engages in an inside thread of a spindle drive device.

9. Gear drive unit according to claim 1, characterized in that the component can be displaced radially to the longitudinal axis by means of the pre-stressed elastic element.

10. Gear drive unit according to claim 9, characterized in that the elastic element is supported on a covering of the gear housing.

11. Gear drive unit according to claim 9, characterized in that the component is formed together with the elastic element as a wedge-shaped wavy leaf spring.

12. Gear drive unit to adjust moveable parts in a motor vehicle, comprising a gear housing and a shaft positioned therein along a longitudinal axis, which shaft is supported on the housing via an axial stopping face and a conical stopping face, wherein at least one of the stopping faces is inclined perpendicular to the longitudinal axis against a plane by an angle of inclination in order to generate an axial force, and a component, which cooperates with at least one of the stopping faces, is arranged in a displaceable manner perpendicular to the longitudinal axis, and the component causes an elastic element to displace in a radial direction thereby maintaining an axial force to equalize shaft longitudinal play, wherein the component can be displaced by an elastic ring element, the ring element being formed so that it can be compressed causing it to be expanded radially, and is arranged between the axial stopping face and the conical stopping face.

13. Gear drive unit according to claim 12, characterized in that at least one of the stopping faces is cone-shaped, with annular stair steps.

14. Gear drive unit according to claim 12, characterized in that at least one of the stopping faces or the component features a surface having a stair-step profile.

15. Gear drive unit according to claim 12, characterized in that at least one of the stopping faces is cone-shaped, with a surface having annular stair steps.

16. Gear drive unit according to claim 12, characterized in that the component is one piece with the one stopping face, as a stopping element.

17. Gear drive unit according to claim 12, wherein the shaft features at least one collar, with which the shaft is supported on the gearing housing via the component.

18. Gear drive unit according to claim 12, wherein that the shaft features a worm toothing or thread toothing, and engages in an inside thread of a spindle drive device.

* * * * *